(12) United States Patent
Yang

(10) Patent No.: US 11,306,737 B2
(45) Date of Patent: Apr. 19, 2022

(54) INFLATOR WITH AN AIR GUIDING SLEEVE

(71) Applicant: Dongguan Richtek Electronics Co., Ltd., Dongguan (CN)

(72) Inventor: Ken Yang, Dongguan (CN)

(73) Assignee: Dongguan Richtek Electronics Co., Ltd., Dongguan (CN)

( * ) Notice: Subject to any disclaimer, the term of this patent is extended or adjusted under 35 U.S.C. 154(b) by 0 days.

(21) Appl. No.: 17/247,042

(22) Filed: Nov. 24, 2020

(65) Prior Publication Data
US 2021/0079930 A1 Mar. 18, 2021

Related U.S. Application Data

(63) Continuation-in-part of application No. 16/162,045, filed on Oct. 16, 2018, now abandoned.

(30) Foreign Application Priority Data

Aug. 16, 2018 (CN) .......................... 201810934815.5

(51) Int. Cl.
*F04D 29/58* (2006.01)
*F04D 25/06* (2006.01)
(Continued)

(52) U.S. Cl.
CPC .......... *F04D 29/5806* (2013.01); *F04B 35/04* (2013.01); *F04B 39/066* (2013.01); *F04B 39/121* (2013.01); *F04D 25/06* (2013.01); *F04D 25/08* (2013.01); *F04D 29/403* (2013.01); *F04D 29/584* (2013.01); *H02K 9/06* (2013.01); *B60S 5/046* (2013.01); *F04B 35/06* (2013.01)

(58) Field of Classification Search
CPC ...... F04D 29/5806; F04D 25/06; F04D 25/08; F04D 29/403; F04D 29/584; F04D 25/082; F04D 29/582; F04B 35/04; F04B 39/066; F04B 39/121; F04B 35/06; H02K 9/06; B60S 5/046
See application file for complete search history.

(56) References Cited

U.S. PATENT DOCUMENTS

2013/0228316 A1* 9/2013 Hong .................... F04D 25/082
165/121
2015/0337825 A1* 11/2015 Chou .................... F04B 39/066
417/415

(Continued)

*Primary Examiner* — Kenneth J Hansen
*Assistant Examiner* — David N Brandt
(74) *Attorney, Agent, or Firm* — Wang Law Firm, Inc.

(57) ABSTRACT

An inflator with an air guiding sleeve includes a chassis, a core and a drive motor installed in the chassis, an air guiding sleeve and a cooling fan. The air guiding sleeve has an air guiding hole penetrating through the air guiding sleeve. The drive motor includes a main body and a shaft rotatably installed to the main body, and the shaft has an end protruded from the main body and provided for driving the core to move and the other end protruded from the main body and provided for connecting the cooling fan. The air guiding sleeve includes a positioning shell and an air guiding ring connected to the positioning shell, and the positioning shell is installed to the chassis and/or the drive motor, and the air guiding ring is sheathed onto the external side of the cooling fan and installed around the cooling fan.

8 Claims, 9 Drawing Sheets

(51) Int. Cl.
  *F04D 25/08* (2006.01)
  *H02K 9/06* (2006.01)
  *F04D 29/40* (2006.01)
  *F04B 39/06* (2006.01)
  *F04B 39/12* (2006.01)
  *F04B 35/04* (2006.01)
  *B60S 5/04* (2006.01)
  *F04B 35/06* (2006.01)

(56) References Cited

U.S. PATENT DOCUMENTS

2016/0208789 A1* 7/2016 Chou .................... F04D 25/082
2016/0265522 A1* 9/2016 Chou ...................... F04B 35/06

* cited by examiner

INFLATOR WITH AN AIR GUIDING SLEEVE

FIELD OF THE INVENTION

The present invention relates to the technical field of inflators, and more particularly to an inflator with an air guiding sleeve.

BACKGROUND OF THE INVENTION

An inflator is one of the common devices used for inflating various types of pneumatic tires. During the use of the inflator, wind blades are usually provided for cooling the inflator, but the structural design of most conventional inflators fails to meet the heat dissipation requirements. As a result, the performance of the inflator is affected adversely due to the low heat dissipation efficiency of the inflator.

SUMMARY OF THE INVENTION

In view of the aforementioned drawback of the conventional inflators, the inventor of the present invention based on years of experience in the related industry to conduct extensive research and experiments, and finally developed an inflator with an air guiding sleeve, wherein a rotating cooling fan is provided for flowing air from a chassis through an air guiding hole to increase the wind pressure and wind speed of the air passing through a core and a drive motor, so as to improve the heat dissipation performance of the inflator, and an air guiding ring is provided for protecting the cooling fan and preventing the cooling fan from being damaged by collisions.

Therefore, it is a primary objective of the present invention to provide an inflator with an air guiding sleeve comprising: a chassis; a core and a drive motor, installed in the chassis, and the drive motor being provided for driving the core to inflate an external object, characterized in that the inflator further comprises an air guiding sleeve and a cooling fan, and the air guiding sleeve has an air guiding hole penetrating through the air guiding sleeve, and the drive motor comprises a main body and a shaft rotatably installed to the main body, and the shaft has an end protruded from the main body for driving the core to move, and the other end protruded from the main body for coupling the cooling fan, and the guiding sleeve includes a positioning shell and an air guiding ring coupled to the positioning shell, and the positioning shell is installed to the chassis and/or the drive motor, and an external surface of the positioning shell abuts against the chassis, and the air guiding ring is disposed around the external side of the cooling fan, and the air guiding ring is installed around the cooling fan.

Preferably, the positioning shell has a cross-section in a rectangular shape, and the air guiding ring has a cross-section in a circular shape, and the positioning shell has a cross-sectional area greater than the cross-sectional area of the air guiding ring, and an external surface of the positioning shell abuts against the chassis.

Preferably, the positioning shell has a plurality of limiting arms extending into the air guiding hole, and installed around the central axis of the air guiding sleeve and disposed on the same side of the cooling fan, and a side of each of the limiting arms away from the cooling fan is provided for abutting against the main body.

Preferably, each of the limiting arms has a blocking protrusion formed by extending a free end of the blocking protrusion towards the central axis of the air guiding sleeve, and the plurality of limiting arms are disposed around the main body, and a free end of each of the limiting arms is provided for abutting against an external surface of the main body, and the blocking protrusion is provided for abutting against the main body.

Preferably, each of the limiting arms has a positioning slot concavely formed on a side of the limiting arm away from the cooling fan, and the chassis has a positioning portion extending into the positioning slot.

Preferably, the inflator with an air guiding sleeve further comprises a fixing ring sheathed onto an external side of the drive motor, and an air gap being formed between the drive motor and the chassis; and two lugs convexly formed at both sides of the fixing ring and disposed away from one another, and the two lugs being installed to the chassis.

Preferably, one of the lugs has a limiting bump, and the chassis has a limiting groove for receiving the limiting bump.

Preferably, the drive motor has a circular blind slot concavely formed on an external surface of the drive motor, and the fixing ring is received into the circular blind slot.

Preferably, the drive motor has an anti-rotation slot communicated with the circular blind slot, and the fixing ring has an anti-rotation plate, and the anti-rotation plate and the lug extend into the anti-rotation slot.

Preferably, the chassis has an air inlet, and the chassis has an air inlet hole and an air outlet hole communicated with the air inlet hole, and the core and the drive motor are disposed between the air inlet hole and the air outlet hole.

Preferably, the drive motor has a vent in communication with the air outlet hole.

Preferably, the positioning shell and the air guiding ring are integrally formed.

In summation, the present invention has the following advantages and effects. With the air guiding sleeve, the positioning shell of the air guiding sleeve is provided for positioning the chassis and/or the drive motor precisely to guarantee the cooling fan to be positioned into the air guiding ring of the air guiding sleeve precisely, and the rotating cooling fan extracts the air from the chassis through an air guiding hole to increase the wind pressure and wind speed of the air flowing through the core and the drive motor to improve the heat dissipation performance of the inflator. The air guiding ring is provided for protecting the cooling fan and preventing the cooling fan from being damaged by collisions.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 1:
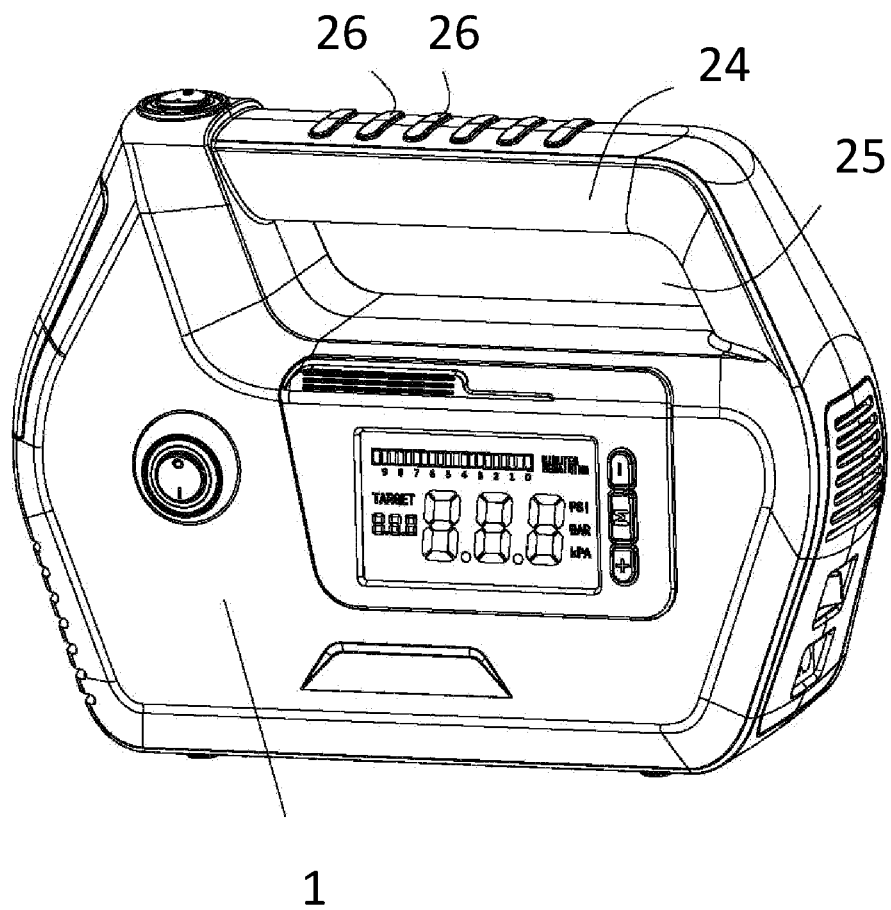
FIG. 1 is a perspective view of the present invention.
Figure 2:
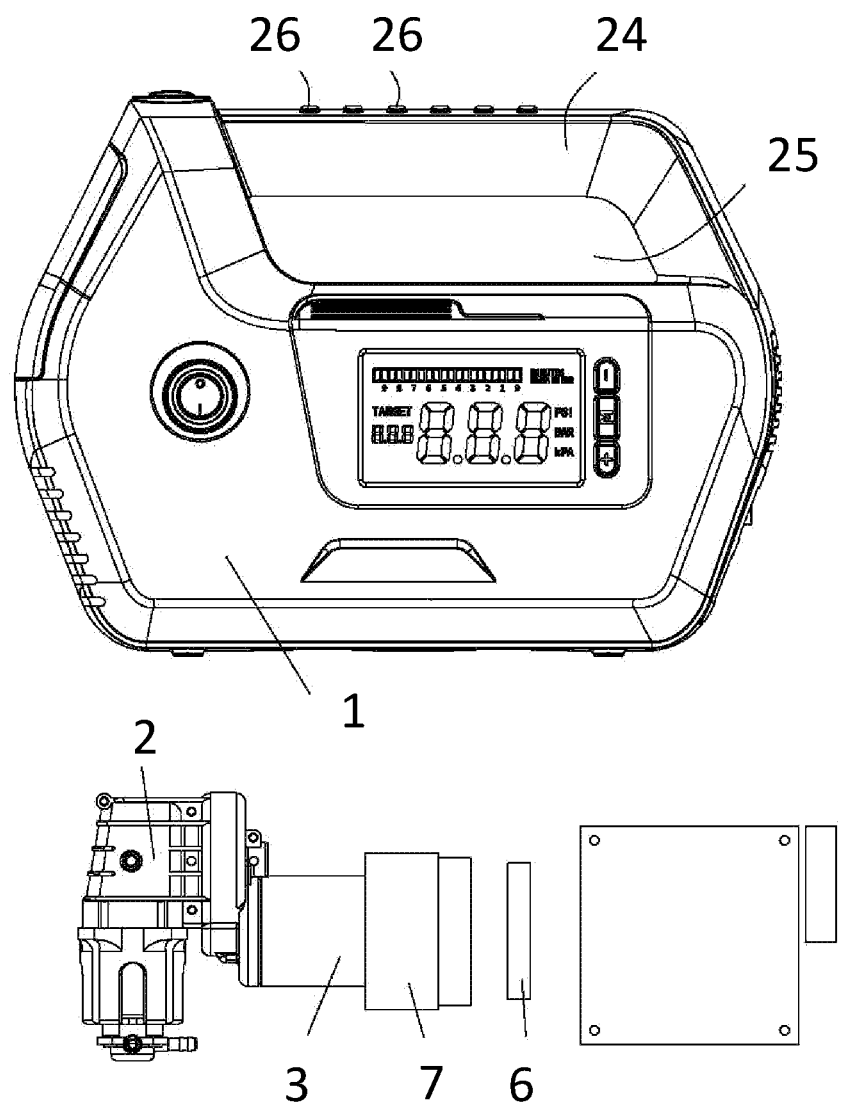
FIG. 2 is an exploded view of the present invention.
Figure 3:
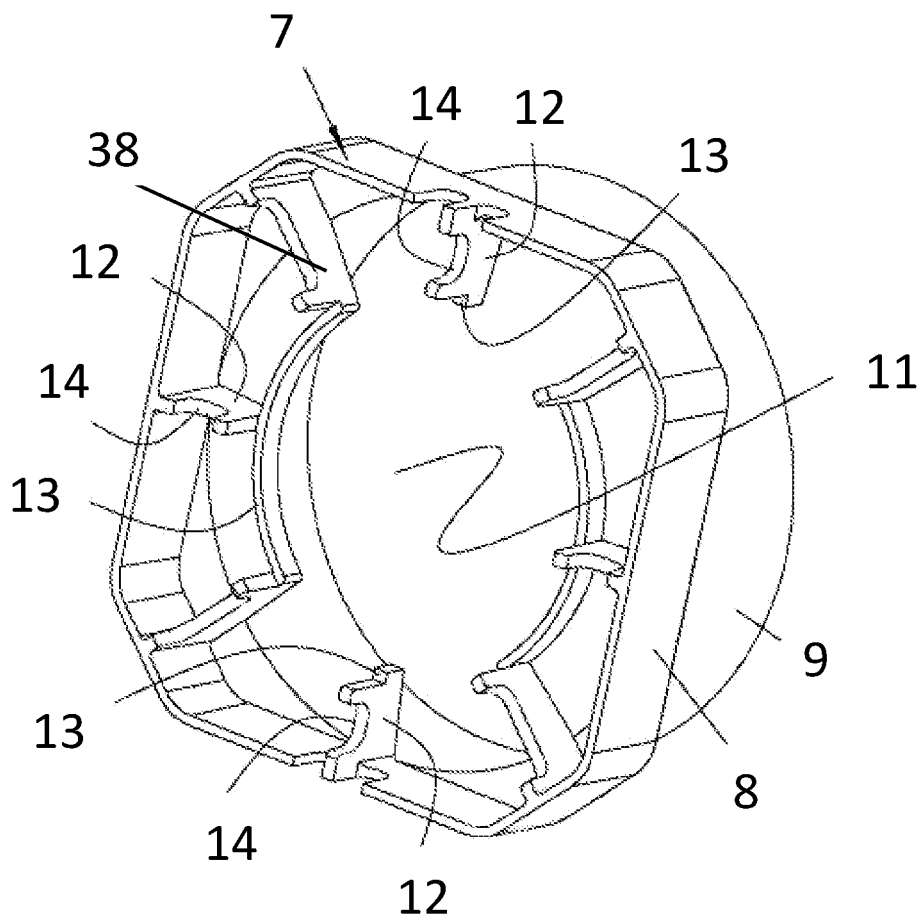
FIG. 3 is a perspective view of an air guiding sleeve of the present invention.
Figure 4:
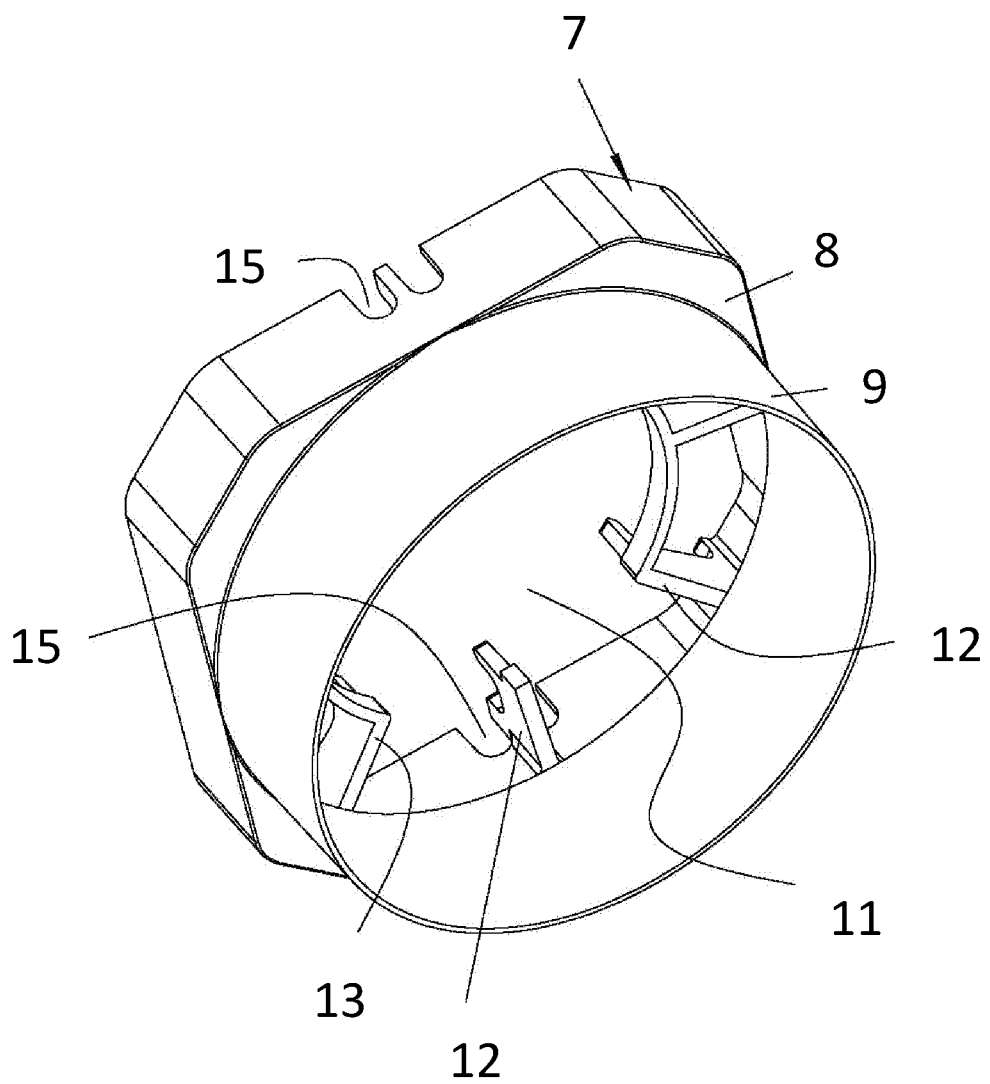
FIG. 4 is another perspective view of an air guiding sleeve of the present invention.
Figure 5:
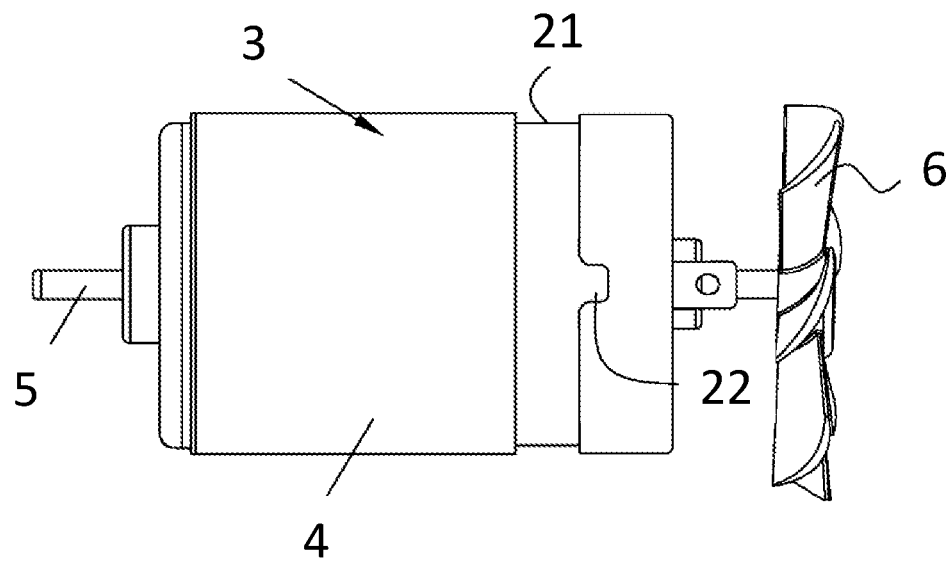
FIG. 5 is a front view of a drive motor of the present invention.
Figure 6:
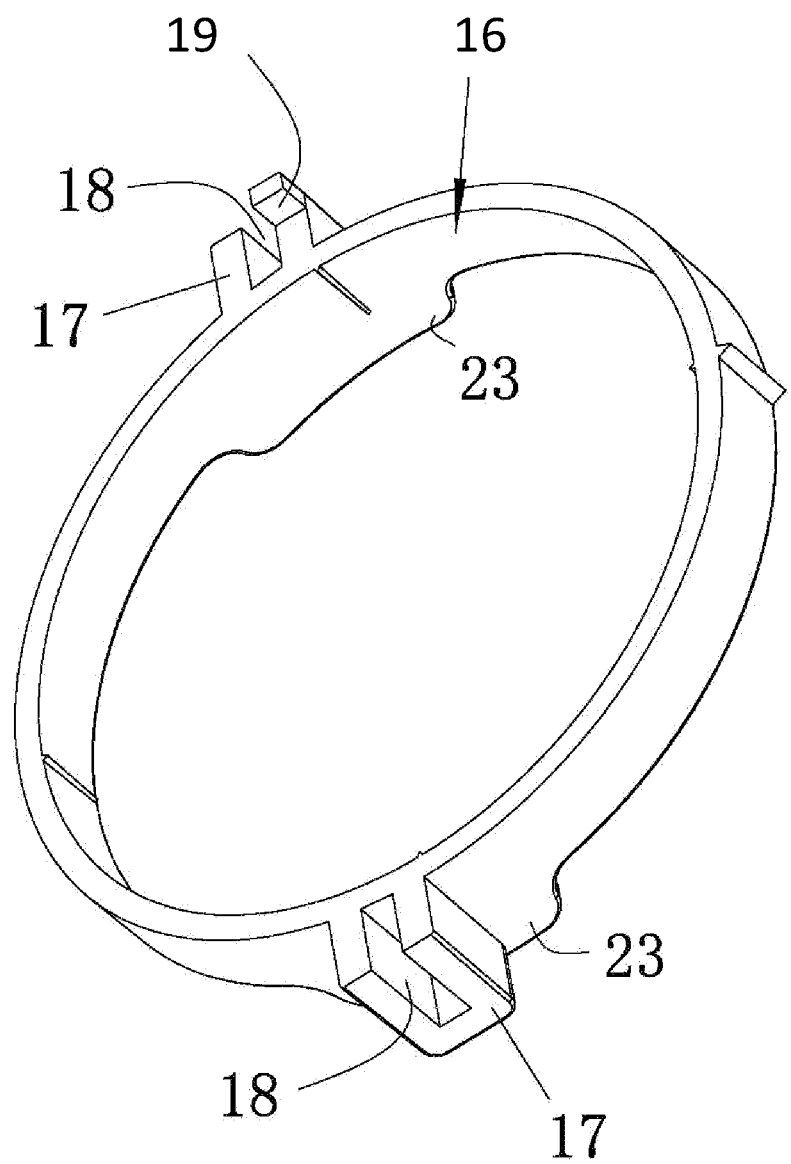
FIG. 6 is a perspective view of a fixing ring of the present invention.
Figure 7:
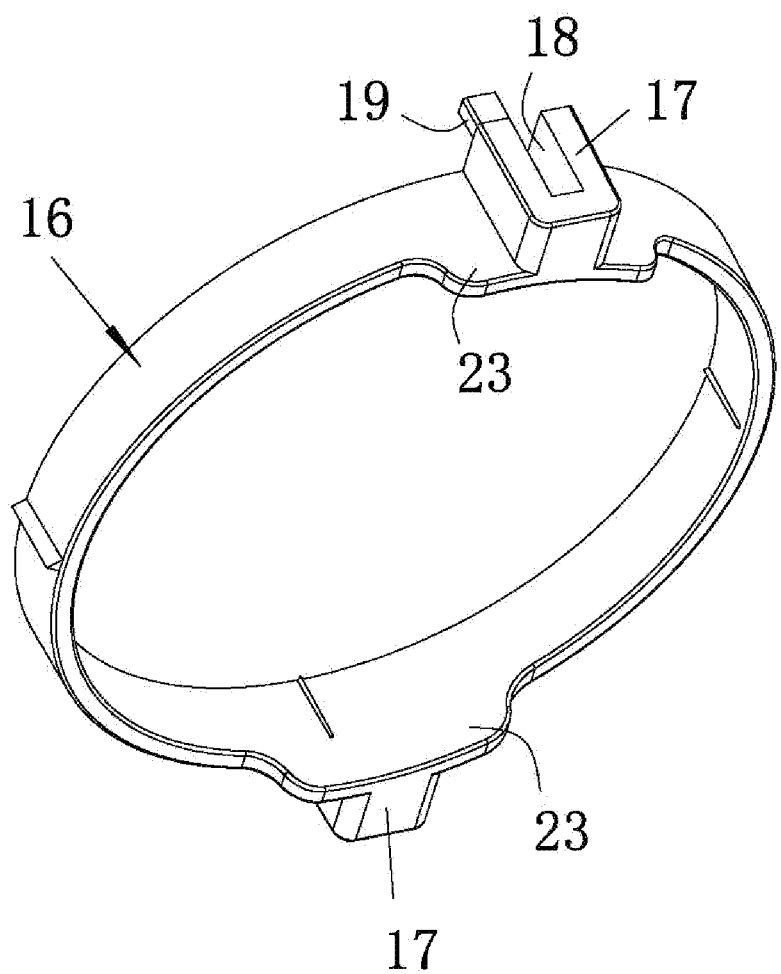
FIG. 7 is another perspective view of a fixing ring of the present invention.
Figure 8:
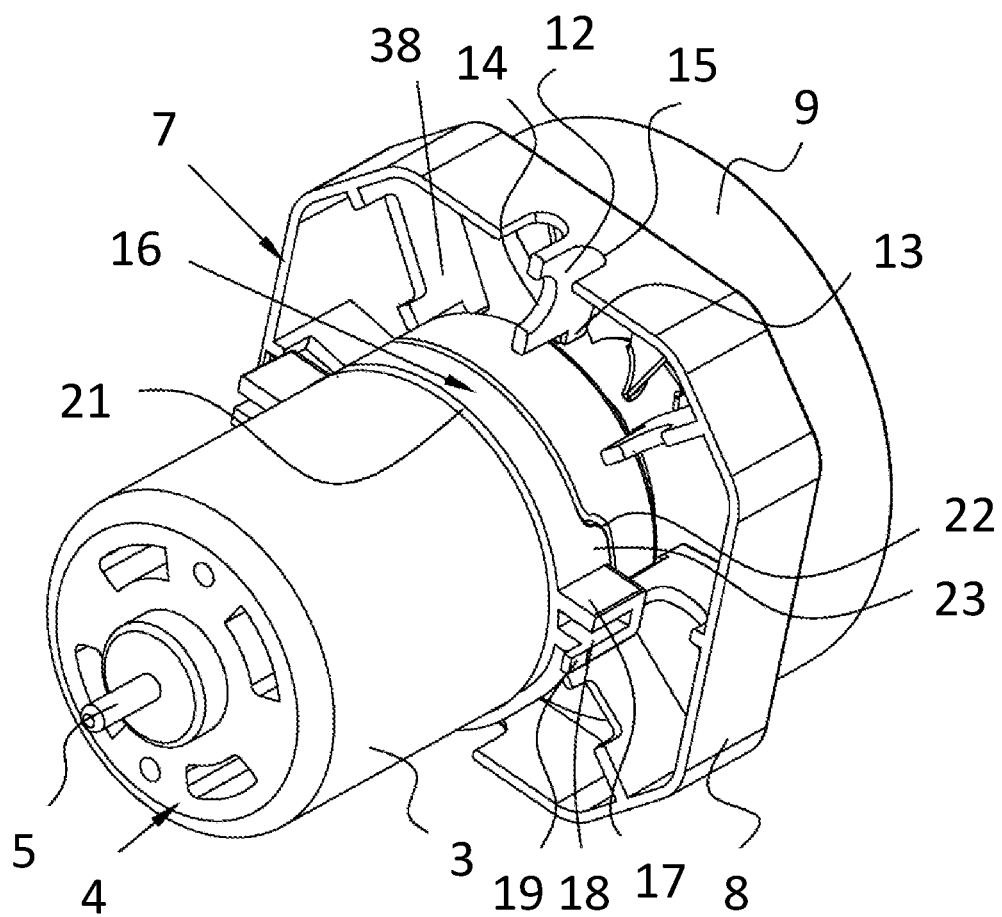
FIG. 8 is a partial exploded view of the drive motor attached to the air guiding sleeve of the present invention.
Figure 9:
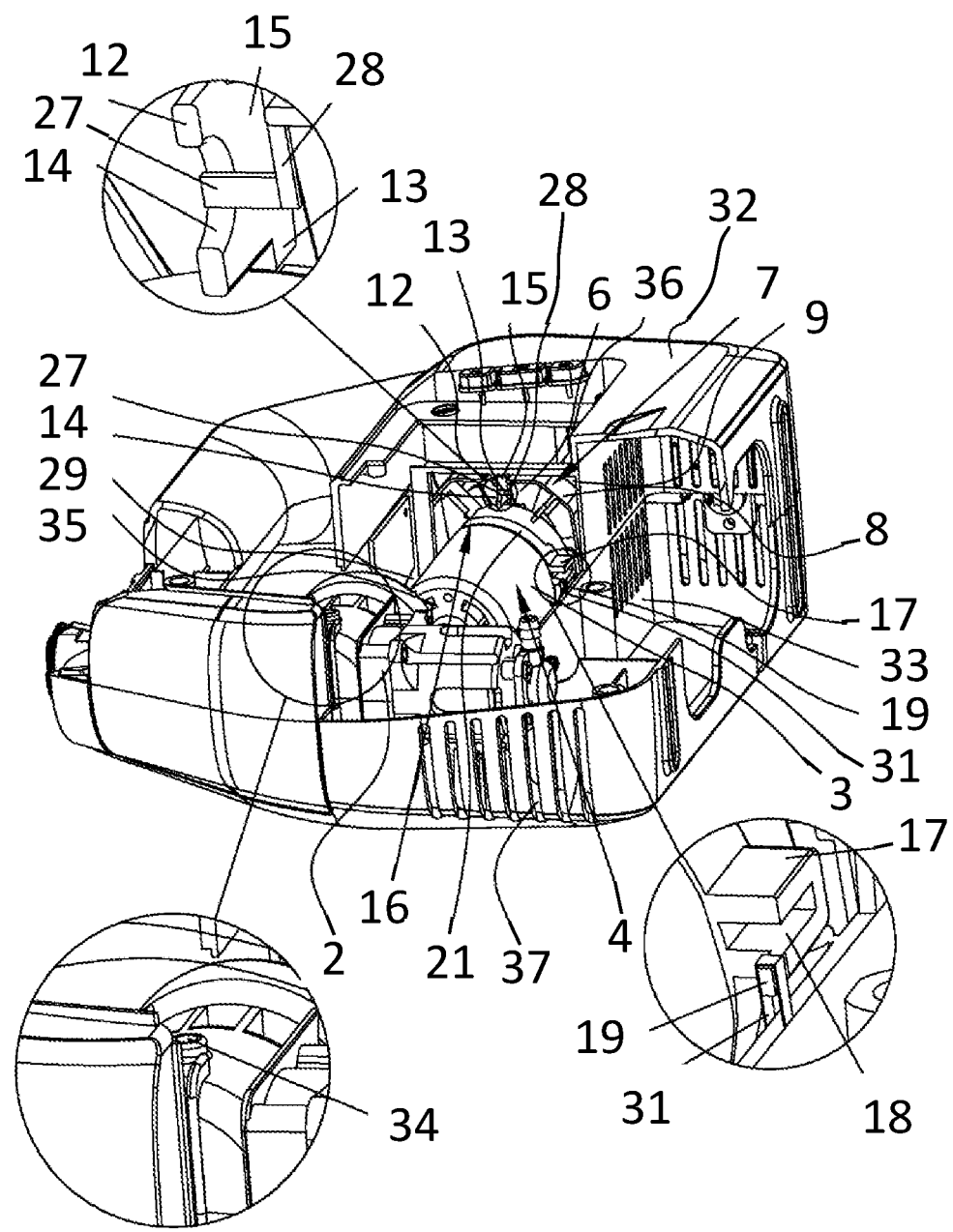
FIG. 9 is a schematic view showing the assembled status of an air guiding sleeve, a fixing ring and a drive motor of the present invention.

With reference to FIGS. 1 to 9 for an inflator with an air guiding sleeve in accordance with the present invention, the inflator comprises: a chassis 1; a core 2 and a drive motor 3 installed in the chassis 1, and the drive motor 3 being provided for driving the core 2 to inflate an external object (such as a pneumatic tire or a balloon, etc.), and the chassis 1 having an air inlet hole 36 and an air outlet hole 37 communicated with the air inlet hole; an air guiding sleeve 7 and a cooling fan 6, and the air guiding sleeve 7 having an air guiding hole 11 penetrating through the air guiding sleeve 7, and the core 2 and the drive motor 3 being disposed between the air inlet hole 36 and the air outlet hole 37. Preferably, the core 2 and the drive motor 3 are disposed collinearly between the air inlet hole 36 and the air outlet hole 37, and the drive motor 3 comprises a main body 4 and a shaft 5 rotatably installed to the main body 4, and both ends of the shaft 5 are protruded from both left and right ends of the main body 4 respectively, and the end of the shaft 5 protruded from an end of the main body 4 is provided for driving the core 2 to move, and the other end of the shaft 5 protruded from the other end of the main body 4 is provided for connecting the cooling fan 6. The air guiding sleeve 7 comprises a positioning shell 8 and an air guiding ring 9 coupled to the positioning shell 8, wherein the positioning shell 8 and the air guiding ring 9 are integrally formed as a one-piece structure, and the positioning shell 8 is mounted onto the chassis 1 and/or the drive motor 3, and an external surface of the positioning shell 8 abuts against the chassis 1, and the air guiding ring 9 encloses the cooling fan 6, and the core 2 and the chassis 1 can be detachably coupled to each other.

During the use of the inflator, the core 2 and the drive motor 3 are major heat generating components. The inflator of the present invention comes with the air guiding sleeve 7, and the positioning shell 8 of the air guiding sleeve 7 is provided for positioning the chassis 1 and/or the drive motor 3 precisely to guarantee the cooling fan 6 to be positioned precisely in the air guiding ring 9 of the air guiding sleeve 7, so that the rotating cooling fan 6 can extract the air from the chassis 1 through the air guiding hole 11 of the air guiding sleeve 7 to increase the wind pressure and wind speed of the air flowing through the core 2 and the drive motor 3, so as to improve the heat dissipation performance of the inflator. The air guiding ring 9 is provided for protecting the cooling fan 6, preventing the cooling fan 6 from being damaged by collisions, and extending the service life of the cooling fan 6.

The positioning shell 8 has a cross-section in a rectangular shape, and the air guiding ring 9 has a cross-section in a circular shape, and the positioning shell 8 has a cross-sectional area greater than the cross-sectional area of the air guiding ring 9, and the difference between the cross-sectional area of the positioning shell 8 and the cross-sectional area of the air guiding ring 9 gives a flow rate difference of the air to achieve a change of the wind speed of the flowing air, so as to improve the cooling effect of the cooling fan 6 to the drive motor 3 and the core 2. The positioning shell 8 has an external surface abutting against the chassis 1, wherein a flat external surface of the positioning shell 8 abuts the chassis 1, so that the positioning shell 8 and the chassis 1 can be attached altogether securely to prevent the positioning shell 8 from rotating with respect to the chassis 1. In this embodiment, the positioning shell 8 has a plurality of lead inclined plates 38 disposed at the corners of the positioning shell 8 respectively, wherein the quantity of the lead inclined plates 38 is equal to four, and the four lead inclined plates 38 are arranged around the central axis of the air guiding hole 11. The lead inclined plates 38 enhance the strength of the positioning shell 8 to prevent the positioning shell 8 from being compressed and deformed by the chassis 1 easily, so as to improve the performance of the air guiding sleeve 7.

The positioning shell 8 has a plurality of limiting arms 12 extending into the air guiding hole 11 and disposed around the central axis of the air guiding sleeve 7, wherein the limiting arms 12 are situated on the same side of the cooling fan 6, and a side of each limiting arm 12 away from the cooling fan 6 is provided for abutting against the main body 4. In an assembling process of the inflator, the air guiding sleeve 7 is assembled to the main body 4 of the drive motor 3 until an end of the main body 4 abuts against a side of the limiting arm 12, such that the assembling position between the main body 4 and the air guiding sleeve 7 can be positioned precisely, and then the cooling fan 6 is installed into the air guiding ring 9.

Each of the limiting arms 12 has a blocking protrusion 13 formed by extending a free end of the limiting arm 12 towards the central axis of the air guiding sleeve 7, and the plurality of limiting arms 12 is disposed around the main body 4, and the blocking protrusions 13 of the plurality of limiting arms 12 are arranged around the central axis of the air guiding hole 11, and the free end of each of the limiting arms 12 is provided for abutting an external surface of the main body 4 to prevent the drive motor 3 from moving along the radial direction of the air guiding sleeve 7 and with respect to the air guiding sleeve 7, and the blocking protrusion 13 is provided for abutting against an end surface of an end of the main body 4 to limit the assembling position between the main body 4 and the air guiding sleeve 7 precisely. Preferably, the air guiding sleeve 7 has a transitional arm (not shown in the figure) coupled to the plurality of limiting arms 12, wherein the transitional arm is provided for coupling the plurality of limiting arms altogether. Compared with the strength of a single limiting arm 12, this arrangement can prevent the deformation of the single limiting arm 12 with minimal effort and prevents the precise positioning between the air guiding sleeve 7 and the drive motor 3 from being affected.

The limiting arm 12 has a positioning slot 14 concavely formed on a side of the limiting arm 12 away from the cooling fan 6, and the chassis 1 has a positioning portion 27 extending into the positioning slot 14. A sidewall of the positioning slot 14 abuts against the positioning portion 27 to effectively prevent the chassis 1 and the positioning shell 8 from moving with respect to each other.

The positioning shell 8 has a notch 15 concavely formed at a face of the positioning shell 8 away from the air guiding ring 9, and the chassis 1 has a latching block 28 extending into the notch 15. In this embodiment, the chassis 1 is formed by engaging an upper casing 32 and a lower casing 33. After the inflator is assembled, the latching block 28 is extended into the notch 15, and the latching block 28 is provided to assist in improving the strength of the positioning shell 8. After the upper casing 32 and the lower casing 33 abut against the external surface of the positioning shell 8, the positioning shell 8 resists deformation by the strength of its structure. During assembly, after the core 2 and the drive motor 3 already coupled with the air guiding sleeve 7 are placed into the lower casing 33, the upper casing 32 is covered thereon, wherein a screw hole 34 is formed on the core 2 and provided for fixing the core 2 onto the lower casing 33.

The inflator with an air guiding sleeve further comprises a fixing ring 16 sheathed on to an external surface of the drive motor 3 and fixed onto the chassis 1, and an air gap 29 formed between the external surface of the drive motor 3 and the internal surface of the chassis 1, and the cooling fan 6 drives the air flowing through the air gap 29 between the drive motor 3 and the chassis 1, so as to dissipate the heat of the core 2 and the drive motor 3 and improve the cooling effect of the inflator.

The fixing ring 16 has two lugs 17 formed on both sides away from the fixing ring 16 and configured to be opposite to each other, and the two lugs 17 are fixed onto the chassis 1 to decrease the contact area of the fixing ring 16 and the chassis 1. Preferably, both lugs 17 have a latching blind slot 18, and the fixing ring 16 is made of plastic. With the latching blind slot 18, the thickness of the lugs 17 can be reduced (compared to conventional solid lugs 17) to prevent defects of the lugs 17 caused by plastic shrinkage rate or excessive thickness of the lugs 17. The chassis 1 may have two latching blocks (not shown in the figure) if needed, and the two latching blocks are extended into the latching blind slots 18 respectively.

After the fixing ring 16 is installed onto the chassis 1, the latching block of the chassis 1 is extended into the latching blind slot 18, and a sidewall of the latching blind slot 18 is provided for blocking the latching block to limit the position of the fixing ring 16 of the chassis 1. After the inflator is assembled, the fixing ring 16 can be prevented effectively from moving with respect to the chassis 1.

One of the lugs 17 has a limiting bump 19, and the chassis 1 has a limiting groove 31 for receiving the limiting bump 19. During the process of installing the fixing ring 16 and the chassis 1, the limiting bump 19 is aligned precisely with the limiting groove 31 first, and then the chassis 1 and the fixing ring 16 are installed, so that the limiting bump 19 is plugged into the limiting groove 31 to align the positions of the fixing ring 16 and the chassis 1 precisely, so as to prevent a defect of the assembled inflator caused by the wrong installation of the fixing ring 16.

The drive motor 3 has a circular blind slot 21 concavely formed on an external surface of the drive motor 3, and the fixing ring 16 is received into the circular blind slot 21, and a sidewall of the circular blind slot 21 is provided for blocking the fixing ring 16 to prevent the fixing ring 16 from moving with respect to the drive motor 3, and a portion of the main body of the fixing ring 16 is not extended out from the external surface of the drive motor 3. In other words, the remaining portion of the fixing ring 16 other than the two lugs 17 is completely sunk into the circular blind slot 21 to prevent the fixing ring 16 from blocking the air flowing through the air gap 29 between the drive motor 3 and the chassis 1, so as to guarantee stable air flow for the air driven by the cooling fan 6 and improve the cooling effect.

The drive motor 3 has an anti-rotation slot 22 communicated with the circular blind slot 21, and concavely formed on a sidewall of the circular blind slot 21. The fixing ring 16 has an anti-rotation plate 23, so that after the fixing ring 16 is sheathed on the drive motor 3, the anti-rotation plate 23 and the lug 17 are extended into the anti-rotation slot 22, and a sidewall of the anti-rotation slot 22 is provided for abutting against the anti-rotation plate 23 to prevent the fixing ring 16 and the drive motor 3 from rotating with respect to one another. In this embodiment, the lugs 17 are coupled to the fixing ring 16 and the anti-rotation plate 23 to achieve the effects of extending the length of the lugs 17, assist in extending the length of the latching blind slot 18, and improving the latching effect between the latching block and the lugs 17.

In this embodiment, the fixing ring 16 is made of soft plastic such as silicone, wherein the soft plastic gives a better effect of absorbing the shock produced during the operation of the drive motor 3.

The chassis 1 has a grip 24, and both ends of the grip 24 are coupled to the chassis 1, and a yielding hole 25 is formed between the grip 24 and the chassis 1. During use, a user may insert a finger into the yielding hole 25 and then hold the grip 24 by a hand to facilitate the chassis 1 to move the inflator conveniently, so as to improve the user's experience. Preferably, the grip 24 further has a frictional bump 26 abutting the user's hand to increase the friction between the user's hand and the rip 24. The grip 24 may have more than one frictional bump 26, and the frictional bumps 26 are configured collinearly along the lengthwise direction of the grip 24.

The drive motor has a vent 35 communicated with the air outlet hole 37 and provided for dissipating the heat of the drive motor 3 quickly.

While the invention has been described by means of specific embodiments, numerous modifications and variations could be made thereto by those skilled in the art without departing from the scope and spirit of the invention set forth in the claims.

What is claimed is:

1. An inflator with an air guiding sleeve, comprising: a chassis, and a core and a drive motor installed in the chassis, and the drive motor being provided for driving the core to inflate an external object, characterized in that the inflator further comprises the air guiding sleeve and a cooling fan, and the air guiding sleeve has an air guiding hole penetrating through the air guiding sleeve, and the drive motor comprises a main body and a shaft rotatably installed to the main body, and the shaft has an end protruded from the main body for driving the core to move, and the another end protruded from the main body for coupling the cooling fan, air and the guiding sleeve includes a positioning shell and an air guiding ring coupled to the positioning shell, and the positioning shell is installed to the chassis and/or the drive motor, and an external surface of the positioning shell abuts against the chassis, and the air guiding ring encloses the cooling fan, and the core is detachably coupled to the chassis; and the positioning shell has a notch concavely formed at an end of the positioning shell away from the air guiding ring; and the positioning shell has a cross-sectional area in an octagonal shape, and the air guiding ring has a cross-sectional area in a circular shape, and the positioning shell cross-sectional area is greater than the cross-sectional area of the air guiding ring.

2. The inflator with the air guiding sleeve according to claim 1, further comprising a fixing ring sheathed onto an external side of the drive motor, and an air gap being formed between the drive motor and the chassis; and two lugs convexly formed at opposing sides of the fixing ring and extending away from one another, and the two lugs being coupled to the chassis.

3. The inflator with the air guiding sleeve according to claim 2, wherein one of the lugs has a limiting bump, and the chassis has a limiting groove for receiving the limiting bump.

4. The inflator with the air guiding sleeve according to claim 2, wherein the drive motor has a circular blind slot concavely formed on the external side of the drive motor, and the fixing ring is received into the circular blind slot.

5. The inflator with the air guiding sleeve according to claim 4, wherein the drive motor has an anti-rotation slot communicated with the circular blind slot, and the fixing ring has an anti-rotation plate, and the anti-rotation plate and the lug extend into the anti-rotation slot.

6. The inflator with the air guiding sleeve according to claim 1, wherein the chassis has an air inlet hole and an air outlet hole communicated with the air inlet hole, and the core and the drive motor are disposed between the air inlet hole and the air outlet hole.

7. The inflator with the air guiding sleeve according to claim 6, wherein the drive motor has a vent communicated with the air outlet hole.

8. The inflator with the air guiding sleeve according to claim 1, wherein the positioning shell and the air guiding ring are integrally formed.

* * * * *